(12) United States Patent
Röttger

(10) Patent No.: US 8,350,854 B2
(45) Date of Patent: Jan. 8, 2013

(54) METHOD AND APPARATUS FOR VISUALIZING A TOMOGRAPHIC VOLUME DATA RECORD USING THE GRADIENT MAGNITUDE

(75) Inventor: Stefan Röttger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1126 days.

(21) Appl. No.: 12/155,979

(22) Filed: Jun. 12, 2008

(65) Prior Publication Data

US 2009/0002369 A1 Jan. 1, 2009

(30) Foreign Application Priority Data

Jun. 15, 2007 (DE) .......................... 10 2007 027 738

(51) Int. Cl.
*G06T 17/00* (2006.01)
*G06K 9/00* (2006.01)
(52) U.S. Cl. ........................................ 345/424; 382/131
(58) Field of Classification Search .................. 345/419, 345/424
See application file for complete search history.

(56) References Cited

U.S. PATENT DOCUMENTS

| | | | | |
|---|---|---|---|---|
| 4,737,921 A | * | 4/1988 | Goldwasser et al. | 345/421 |
| 4,835,712 A | * | 5/1989 | Drebin et al. | 345/423 |
| 6,369,816 B1 | | 4/2002 | Gasparakis | |
| 6,501,450 B1 | * | 12/2002 | Bjerke | 345/84 |
| 6,573,893 B1 | * | 6/2003 | Naqvi et al. | 345/424 |
| 6,995,763 B2 | | 2/2006 | Accomazzi | |
| 2005/0110791 A1 | * | 5/2005 | Krishnamoorthy et al. | 345/419 |
| 2005/0143654 A1 | * | 6/2005 | Zuiderveld et al. | 600/443 |
| 2006/0152502 A1 | | 7/2006 | Barth | |

OTHER PUBLICATIONS

Gerald Nikolaus Sahling: "Interactive 3D Scatterplots—From High Dimensional Data to Insight", Master Thesis: Niki Sahling Dec. 3, 2002, http://www.VRVis.at/vis/resources/DA-NSahling/.

* cited by examiner

*Primary Examiner* — Ulka Chauhan
*Assistant Examiner* — Anh-Tuan V Nguyen
(74) *Attorney, Agent, or Firm* — Harness, Dickey & Pierce, P.L.C.

(57) ABSTRACT

A method and an apparatus are disclosed for visualizing a tomographic volume data record of an object volume. In at least one embodiment of the method, the gradient magnitude is additionally determined for each voxel of the volume data record and an at least two-dimensional transfer function is provided which assigns a color value and an opacity value to each combination of gradient value and scalar of the voxel. Here, at least the opacity value and the color value are modulated by the gradient value. The transfer function is applied to the previously determined gradient values and scalar values and the volume data record is displayed with the respective color and opacity values of the voxels by way of a volume rendering technique. The method permits an improved recognizability of structures, in particular in volume data records from medical imaging.

13 Claims, 2 Drawing Sheets

METHOD AND APPARATUS FOR VISUALIZING A TOMOGRAPHIC VOLUME DATA RECORD USING THE GRADIENT MAGNITUDE

PRIORITY STATEMENT

The present application hereby claims priority under 35 U.S.C. §119 on German patent application number DE 10 2007 027 738.7 filed Jun. 15, 2007, the entire contents of which is hereby incorporated herein by reference.

FIELD

Embodiments of the present invention generally relate to a method and/or an apparatus for visualizing a tomographic volume data record of an object volume, as is obtained, for example, in medical imaging after administering a contrast agent.

BACKGROUND

To visualize vessels, that is to say arteries and/or veins, tomographic imaging techniques, such as computed tomography (CT) or magnetic resonance imaging (MRI) are presently being used. The visualization of not only individual slices, but of the complete volume data record, requires the use of suitable volume rendering techniques, such as MIP (maximum intensity projection) for example, in order to impart a spatial impression to the user.

The transfer function plays an important role in a plurality of volume rendering techniques. The transfer function assigns to the data values of the volume data record optical properties by means of which they are displayed in the rendered image. A known example of this are transfer functions which assign each value of the volume data record a color and opacity (α channel). In this case, equal values of the volume data record are given the same color and the same opacity. To improve the visual display it is also known to modulate the opacity not only with the data value, but additionally with the gradient magnitude as well.

In this manner, edges or surfaces in the volume data record can be emphasized more clearly. The gradient magnitude corresponds to the magnitude of the gradient vector which points in the direction of the steepest gradient from the data value of the voxel to the data values of adjacent voxels. U.S. Pat. No. 6,369,816 B1 furthermore discloses a method, in which both the opacity and the brightness are modulated by the gradient magnitude. The brightness is to be distinguished from the color value, which, throughout the present patent application, is understood to be the H value of the emission (or RGB value) in the HSV (hue, saturation, value) color space.

SUMMARY

In at least one embodiment of the present invention, a method and/or an apparatus are specified for visualizing tomographic volume data records, which, in particular in the area of medical imaging, in many cases permit an improved recognizability of structures of interest within the object volume.

The proposed method of at least one embodiment is applied to tomographic volume data records which occur in medical imaging, for example. Preferably in this case these are volume data records from medical imaging, recorded from an object volume after administering contrast agent. In such volume data records, it is chiefly vessel structures, organs or tumors that are of particular interest. In a volume data record, each data value, referred to as a scalar in the following text, represents a measured value at the location of a volume element (voxel) of the object volume which was recorded by the volume data record. The data value can in this case represent a measure of signal intensity, or also of derived variables, such as, for example, a density value or an attenuation value. In the field of magnetic resonance imaging, a volume data record can be obtained from a temporal sequence of recorded volume data records; it contains so-called WI (wash in) values, which represent a measure of the change in the measured signal intensity at the respective voxel with time. Volume data records based on WI values are used, for example, to recognize tumors or in tumor aftercare.

In the case of at least one embodiment of the proposed method a gradient value, the so-called gradient magnitude, is determined for each scalar of the volume data record, that is to say for the data value of each voxel. The gradient magnitude corresponds to the magnitude of the three-dimensional gradient vector within the volume data record at the location of the respective voxel. An at least two-dimensional transfer function, which assigns a color value (H value in the HSV model) and an opacity value to each combination of gradient value and scalar of the voxel, so that at least the opacity value and the color value are modulated by the gradient value, is used for the visualization. The transfer function can be provided in the form of an LUT (look-up table), for example. The transfer function is applied to the previously determined gradient values and scalars in order to obtain a color value and an opacity value for each voxel of the object volume. The volume data record is then displayed with the respective color and opacity values of the individual voxel by means of a volume rendering technique.

When applying at least one embodiment of the method in the field of medical imaging using contrast agents, individual structures of a volume data record obtained by medical imaging can also be already segmented in advance, so that a volume data record with already segmented image data is used in the present method. Alternatively, regions which are not of interest can also be masked in the later display by a suitable choice of the transfer function (opacity value=0). This can be achieved by setting appropriate threshold values for the scalars in the volume data record, below or above which the opacity value is set to 0.

At least one embodiment of the method is particularly suited for the 3D display of magnetic resonance angiography (MRA) or CT angiography and other contrast agent based examination results. At least one embodiment of the method can be applied to both subtracted and unsubtracted contrast agent images. For the imaging, various volume rendering techniques such as are known to the person skilled in the art in this field, can be used in at least one embodiment of the present method.

At least one embodiment of the method permits the display of arteries, and hence also stenoses, with a substantially improved three-dimensional impression compared to a standard MIP method. This is also true for other fields of application, for example in 3D tumor visualization, in which the total extent of tumors is more recognizable by way of a visualization using at least one embodiment of the present method.

The transfer function preferably carries out a linear assignment of the opacity values to the scalars and the gradient values. Likewise, the color values are preferably assigned linearly to the scalars and/or the gradient values. The linear assignment permits automatic specification of the 2D transfer function so that only the total transparency of the volume has to be prescribed by the user. This substantially simplifies the use of the proposed method since, in practice, setting of the transfer function by the user, as must also be carried out in the abovementioned known techniques, is very difficult. This holds in particular for the present two-dimensional transfer function, which has substantially more degrees of freedom to be specified than does a one-dimensional transfer function.

In contrast to the one-dimensional transfer functions such as are used in the prior art mentioned in the introduction of the description, the two-dimensional transfer function used in at least one embodiment of the present method also additionally modulates the color value (hue, in the HSV color space) by the gradient magnitude. By way of this additional modulation of the color value, the spatial impression and the boundaries of individual structures, in particular of arteries or tumor tissue, are decisively improved in the rendered view of the volume data record.

By way of example, at least one embodiment of the method can be implemented on an image computer by providing a corresponding module for the image computer to determine the gradient magnitude, the multidimensional transfer function, and a module for applying the transfer function to the scalars and gradient values. A suitable rendering module is generally already present in such an image computer for the tomographic imaging of 3D image data records. Furthermore, an interactive user interface should be provided by means of which the user can still change or adapt the transfer function, if necessary, via a suitable manipulation module. The image computer is in this case suitably connected via a graphics card to an image display unit, in particular a color monitor, for visualizing the rendered volume data record.

BRIEF DESCRIPTION OF THE DRAWINGS

The present invention will be briefly explained again below on the basis of example embodiments in conjunction with the drawings, in which.

DETAILED DESCRIPTION OF THE EXAMPLE EMBODIMENTS

Figure 1:
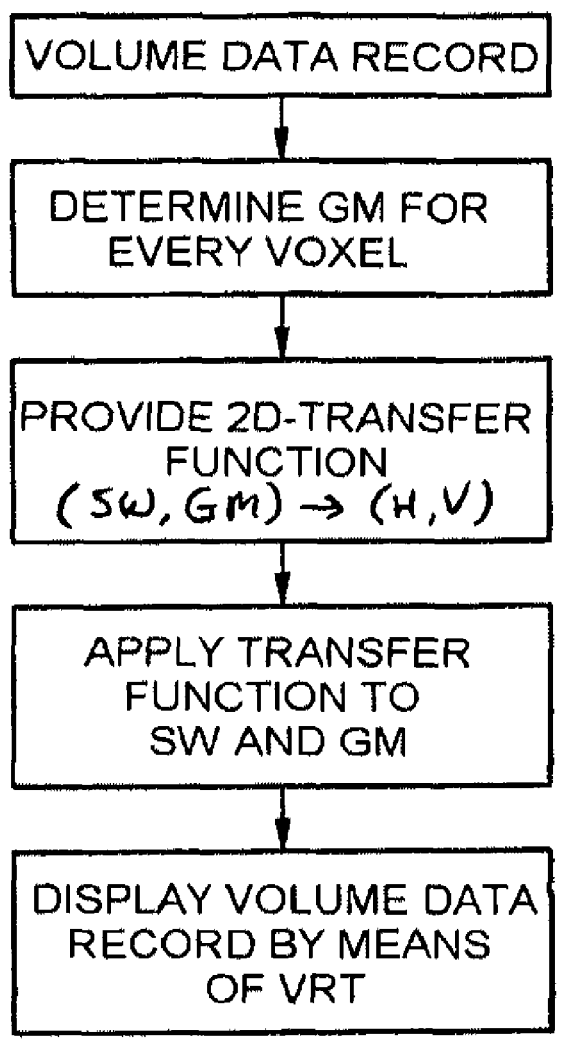
FIG. 1 schematically shows an example procedure for carrying out an embodiment of the present method.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

An embodiment of the proposed method is briefly explained again below on the basis of the exemplary flowchart illustrated in FIG. 1. The method assumes a volume data record which can be generated by a computed tomography scanner or MRI scanner, for example. The volume data record includes a three-dimensional matrix of scalars, for example CT attenuation values, each value thereof corresponding to a particular volume element or voxel of the examined volume of the patient's body the volume data record of which has been recorded. Due to administering a contrast agent in the course of the image recording, significantly stronger attenuation values are obtained in the vessels than in the surrounding soft tissue and bones, so that the vessels can be distinguished from the surrounding tissue and bones by the magnitude of these attenuation values. In the case of an embodiment of the proposed method, a gradient value, the gradient magnitude GM, is now determined from the scalars SW for each voxel. Mathematical algorithms for determining the gradient magnitude for each voxel are known to the person skilled in the art. Due to this determination of the gradient values, each voxel of the volume data record is assigned a gradient value GM in addition to the scalar value SW.

An embodiment of the illustrated method uses a two-dimensional transfer function based on the scalar and gradient values. By way of the transfer function, each combination of scalar SW and gradient value GM is assigned a color value and an opacity value. The setup of the opacities is in this case linear with respect to the scalar and gradient values. Additionally, gradients having different strengths are imaged in different colors, as a result of which the later spatial impression is decisively increased. Whereas in the RGB color space the opacity value corresponds to the α channel, and the color value corresponds to the RGB values, the color value in the HSV color space represents the H value (hue). By applying the transfer function to the volume data record having the scalars and the gradient values, each voxel obtains a corresponding opacity value and color value. The voxels are subsequently displayed using the respective opacity and color values with the aid of a suitable volume rendering technique (VRT).

Figure 2:
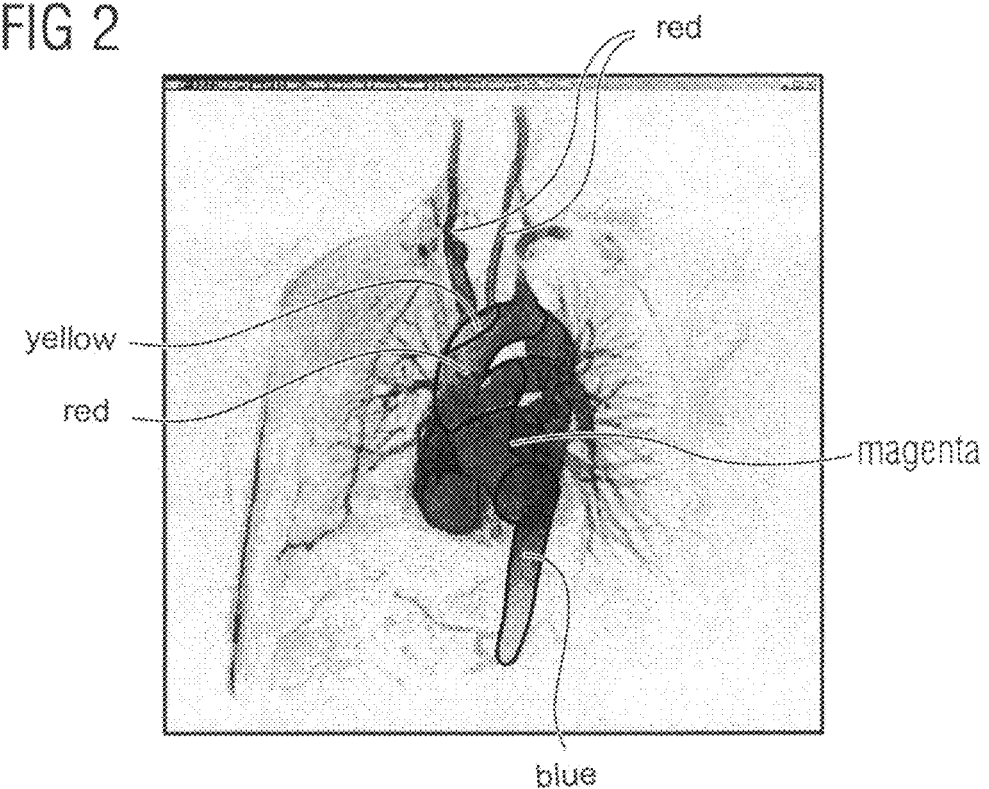
FIG. 2 shows an example of an image of a CT angiography generated by an embodiment of the method.

To this end, FIG. 2 shows an example for imaging the heart based on a volume data record from CT angiography. During the image generation, gradients having different strengths were imaged in different colors, as a result of which the spatial impression was decisively increased. In this case, a blue-magenta-red spectrum was used, which can, however, inevitably only be indicated in the present figure. As is known from the field of digital subtraction angiography, is not necessary to generate a subtraction image in this case for good recognizability of the structures; nevertheless it can, of course, be carried out.

Figure 3:
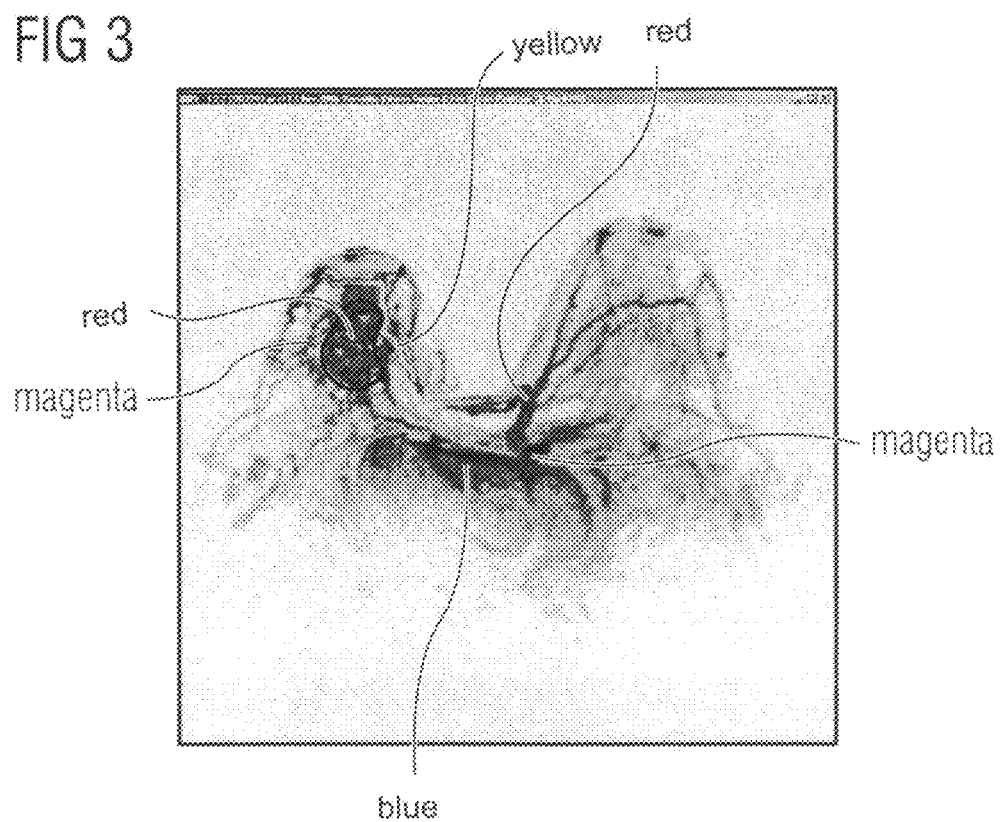
FIG. 3 shows an example of an image of an MRI picture for visualizing a tumor generated by an embodiment of the method.

In a further example embodiment, the method is used for 3D tumor visualization. Here, the provided volume data record includes WI values from a temporal sequence of MRI volume data records. In this case, too, a gradient value is determined for every WI value of the volume data record. By applying the two-dimensional transfer function to the volume data record with the WI and gradient values, an image is obtained in which, compared to a standard MIP method, the total extent of tumors can be recognized in a substantially improved manner. In this case, the setup of the opacities is also linear with respect to the WI and gradient values. In addition, gradients having different strengths are imaged in different colors, as a result of which the distinction between arteries and tumor tissue is substantially improved. Here, FIG. 3 also shows an example of an image in which the impressions of color however can likewise only be reproduced in an indicative manner.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for visualizing a tomographic volume data record of an object volume, comprising:
assigning a scalar to each voxel of the volume data record which represents at least one of a measured variable and a variable derived therefrom, at a location of the voxel in the object volume;
determining a gradient magnitude for each voxel of the volume data record;
providing an at least two-dimensional transfer function which assigns a color value and an opacity value to each combination of gradient magnitude and scalar so that at least the opacity value and the color value are modulated by the gradient magnitude in order to improve the display;
applying the at least two-dimensional transfer function to the scalars and gradient magnitudes of the volume data record to obtain a color value and an opacity value for each voxel of the volume data record; and
displaying the volume data record with the respective color and opacity values of the voxels by way of a volume rendering technique; and carrying out a linear assignment of the opacity values to the scalars and the gradient magnitudes by the transfer function.

2. The method as claimed in claim 1, wherein a linear assignment of the color values to at least one of the scalars and the gradient magnitudes is carried out by the transfer function.

3. The method as claimed in claim 1, for visualizing at least one of MRI and CT volume data records.

4. The method as claimed in claim 1, for visualizing at least one of MRA and CT angiography.

5. The method as claimed in claim 1, for visualizing tumors in at least one of MRI and CT volume data records.

6. The method of claim 1, wherein the method is for visualizing a volume data record from medical imaging recorded after administering a contrast agent.

7. The method as claimed in claim 2, for visualizing at least one of MRI and CT volume data records.

8. The method as claimed in claim 2, for visualizing at least one of MRA and CT angiography.

9. The method as claimed in claim 2, for visualizing tumors in at least one of MRI and CT volume data records.

10. An apparatus for visualizing a tomographic volume data record of an object volume, comprising:
 a memory unit for saving the volume data record;
 a module for determining gradient magnitudes for each voxel of the volume data record;
 a unit in which an at least two-dimensional transfer function is provided which assigns a color value and an opacity value to each combination of scalars and gradient magnitudes of the voxels so that at least the opacity value and the color value are modulated by the gradient magnitude in order to improve display, wherein the unit provides a transfer function by which a linear assignment of the opacity values to the scalars and the gradient magnitudes is carried out;
 an application module in which the transfer function is applied to the scalars and gradient magnitudes of the volume data record to obtain a color value and an opacity value for each voxel of the object volume; and
 a rendering module to display the voxels with the respective color and opacity values on a display device by way of a volume rendering technique.

11. The apparatus as claimed in claim 10, wherein the unit provides a transfer function by which a linear assignment of the color values to at least one of the scalars and the gradient values is carried out.

12. The apparatus of claim 10, wherein the apparatus is for visualizing a volume data record from medical imaging recorded after administering a contrast agent.

13. A non-transitory storage medium including program segments for, when executed on a computer device, causing the computer device to implement the method of claim 1.

* * * * *